United States Patent [19]
Turkowski

[11] Patent Number: 5,625,374
[45] Date of Patent: Apr. 29, 1997

[54] METHOD FOR PARALLEL INTERPOLATION OF IMAGES

[75] Inventor: Kenneth E. Turkowski, Menlo Park, Calif.

[73] Assignee: Apple Computer, Inc., Cupertino, Calif.

[21] Appl. No.: 116,796

[22] Filed: Sep. 7, 1993

[51] Int. Cl.[6] .................................................. G09G 5/00
[52] U.S. Cl. ......................... 345/113; 345/136; 395/135
[58] Field of Search .................. 345/113–116, 136–138, 345/152–155, 199, 200; 395/129–132, 135, 162, 157; 364/715.01, 736, 760

[56] References Cited

U.S. PATENT DOCUMENTS

| | | | |
|---|---|---|---|
| 4,455,611 | 6/1984 | Powers ..................................... | 364/760 |
| 4,586,038 | 4/1986 | Sims et al. ............................... | 395/130 |
| 5,041,998 | 8/1991 | Lawrence et al. ....................... | 364/736 |
| 5,122,981 | 6/1992 | Taniguchi ............................ | 364/715.01 |
| 5,128,658 | 7/1992 | Pappas et al. ........................... | 345/199 |
| 5,146,592 | 9/1992 | Pfeiffer et al. .......................... | 395/157 |
| 5,250,934 | 10/1993 | Denber et al. .......................... | 345/136 |
| 5,268,995 | 12/1993 | Diefendorff et al. .................... | 395/162 |
| 5,444,835 | 8/1995 | Turkowski ............................... | 395/135 |

*Primary Examiner*—Steven Saras
*Attorney, Agent, or Firm*—Greg T. Sueoka, Esq.

[57] ABSTRACT

The present invention is a method for performing a parallel interpolation between corresponding pixel characteristics within a packed foreground pixel data word and a packed background pixel data word. A blending factor is used to indicate the extent to which the pixel characteristics are scaled, where the scaling is related to a power of two. The pixel characteristics within each packed data word are scaled simultaneously. The method of the present invention preferably comprises the steps of: creating shifted versions of the packed foreground pixel data word and the packed background pixel data word; inserting a guard bit into the most-significant bit (MSB) position of each pixel characteristic within the two shifted packed data words; adding the two shifted packed data words to create a packed result data word, where the packed result data word corresponds to a 50% blending; and adding a packed adjustment data word formed from either the packed foreground or background data word to the packed result data word based upon the exact value of the blending factor. Upon completion of the method, the packed result data word is interpreted as a packed composite pixel data word.

27 Claims, 7 Drawing Sheets

| FOREGROUND | 01000000 | 00011100 | 00001011 | 00010111 |
|---|---|---|---|---|
| | BYTE 3 = 64 | BYTE 2 = 28 | BYTE 1 = 11 | BYTE 0 = 23 |
| BACKGROUND | 01000000 | 00100000 | 00001111 | 00101010 |
| | BYTE 3 = 64 | BYTE 2 = 32 | BYTE 1 = 15 | BYTE 0 = 42 |

FIG. 4A

| FIRST | 00100000 | 00001110 | 00000101 | 00001011 |
|---|---|---|---|---|
| | BYTE 3 = 32 | BYTE 2 = 14 | BYTE 1 = 5 | BYTE 0 = 11 |
| SECOND | 00100000 | 00010000 | 00000111 | 00010101 |
| | BYTE 3 = 32 | BYTE 2 = 16 | BYTE 1 = 7 | BYTE 0 = 21 |

FIG. 4B

| RESULT | 01000000 | 00011110 | 00001100 | 00100000 |
|---|---|---|---|---|
| | BYTE 3 = 64 | BYTE 2 = 30 | BYTE 1 = 12 | BYTE 0 = 32 |

FIG. 4C

RESULT | 00100000 | 00001111 | 00000110 | 00010000 |
BYTE 3 = 32  BYTE 2 = 15  BYTE 1 = 6  BYTE 0 = 16

FIG. 4D

ADJUSTMENT | 00100000 | 00001110 | 00000101 | 00001011 |
BYTE 3 = 32  BYTE 2 = 14  BYTE 1 = 5  BYTE 0 = 11

FIG. 4E

COMPOSITE | 01000000 | 00011101 | 00001011 | 00011011 |
BYTE 3 = 64  BYTE 2 = 29  BYTE 1 = 11  BYTE 0 = 27

FIG. 4F

METHOD FOR PARALLEL INTERPOLATION OF IMAGES

BACKGROUND OF THE INVENTION

1. Field of the Invention

The present invention relates generally to image processing, and more particularly, to a method for combining two images in order to form a composite image. Still more particularly, the present invention is a method for performing a parallel interpolation to form a composite of two images on a pixel-by-pixel basis.

2. Description of the Background Art

The fundamental data unit used to perform computational operations is known as a data word. Execution of a given instruction may result in a plurality of data words being fetched from memory, arithmetic or logical operations being performed on any or all of these data words, and the storage in memory of one or more data words corresponding to a result. In modern computer systems having a CPU based upon a microprocessor such as the Intel 80486 or Motorola MC68040, the data word size is 32 binary digits (bits). Nearly all instructions available on a given CPU result in the execution of one or more operations on either single-word or double-word quantities.

Figure 1:
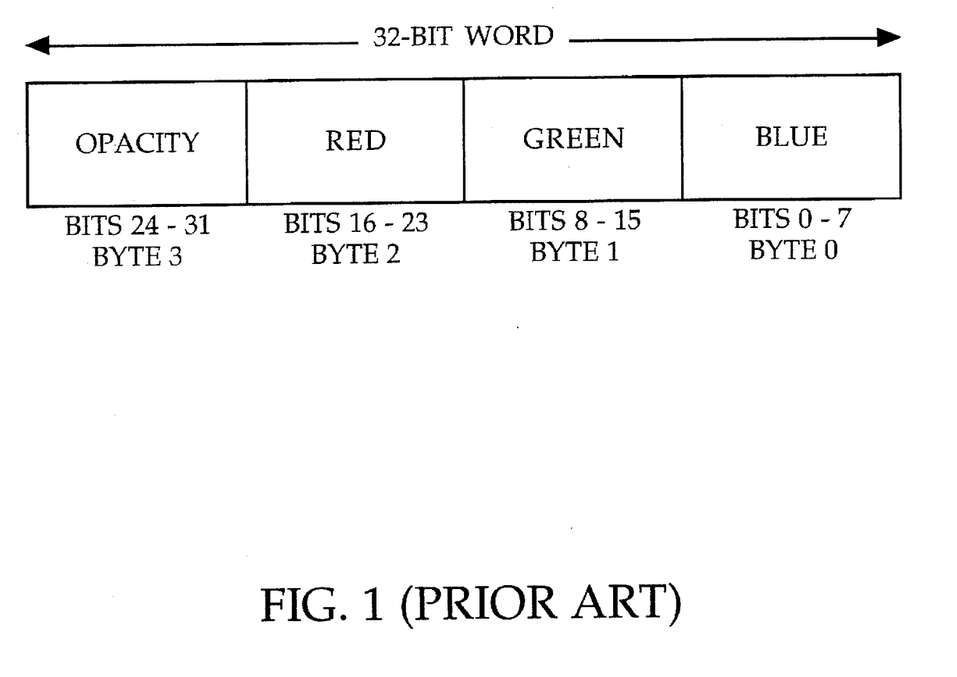
FIG. 1 shows an exemplary prior art pixel representation scheme considered herein.

In computer graphics or image processing applications, an image is comprised of an array of values. Each value of the array corresponds to one picture element (pixel) of the image. Each pixel is typically represented by a plurality of quantities that specify color, shading, or other pixel characteristics. These quantities are generally smaller than a modern computer system's data word, and are commonly represented by 8-bit byte values. An exemplary pixel representation is shown in FIG. 1, where four single-byte values are used to indicate red, green, blue, and opacity characteristics for each pixel. All four bytes are stored or "packed" into a single 32-bit data word. Although other word sizes and pixel characteristic representations exist, the situation shown in FIG. 1 is quite common and will be considered herein.

An important image processing operation is blending, where two images must be combined on a pixel-by-pixel basis to produce a composite image. In forming the composite image, a first image is defined as a foreground image, and a second image is defined as a background image. Their combination is accomplished through an interpolation between corresponding pixels in each image, where each pixel's characteristics are scaled in relation to a blending factor. The blending factor indicates a fractional constant k by which the foreground pixel characteristics are scaled; the corresponding background pixel characteristics are scaled by (1-k). The scaled foreground pixel characteristics are added to the corresponding scaled background pixel characteristics to produce the characteristics of the composite pixel. In certain blending situations, the foreground image is identical to the background image. In this case, the blending is an interpolation between pixel values within a single source image to determine image characteristics at locations that do not precisely correspond to pixel locations. This type of blending occurs in antialiasing, panning, and texture mapping situations.

Figure 2:
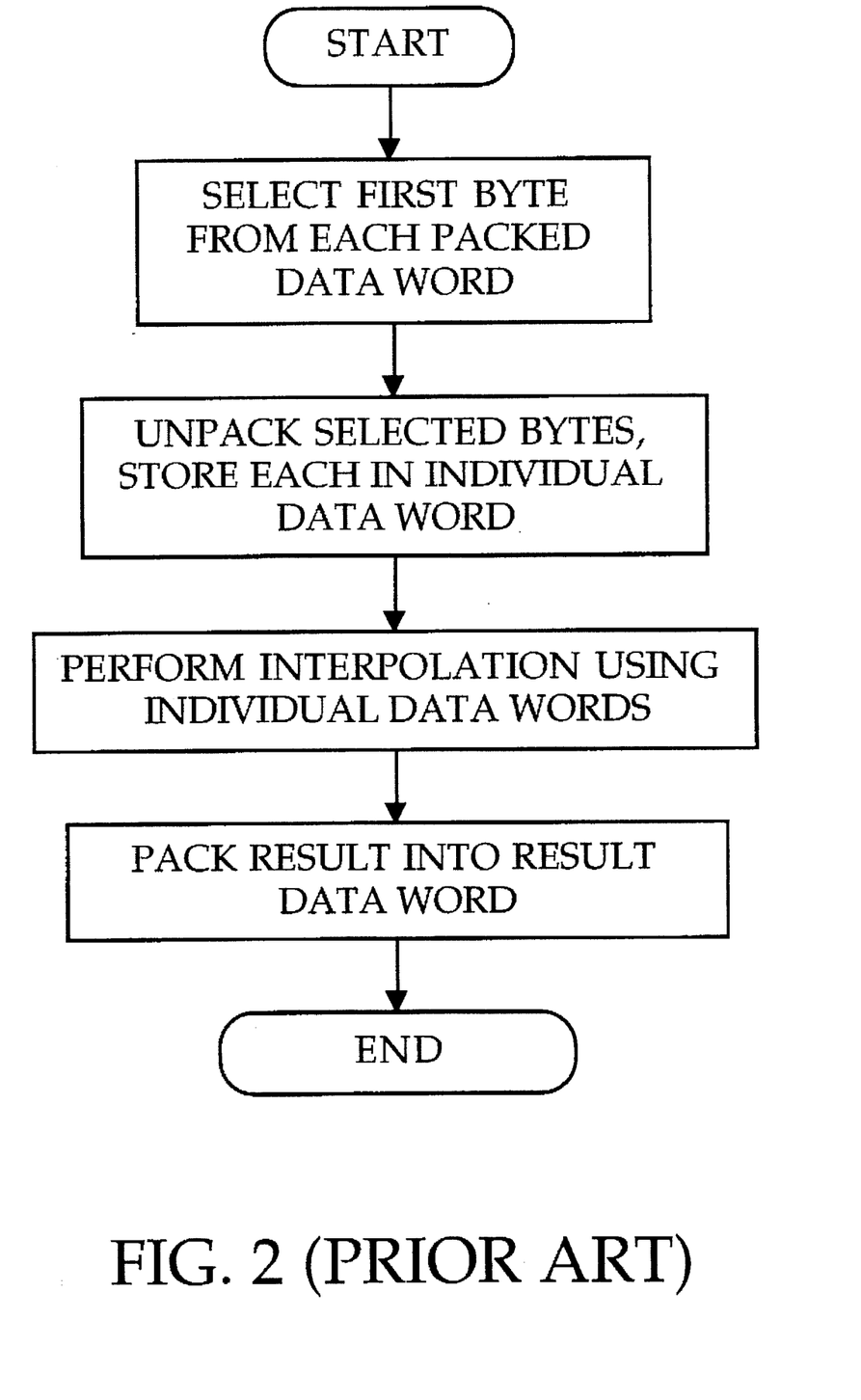
FIG. 2 is a flowchart of the prior art method for performing an interpolation between a plurality of pixel characteristics within two data words.

Since multiple pixel characteristics are packed into a data word, performing operations on the packed data word can result in one or more pixel characteristics within the packed data word having incorrect values. For instance, if the packed data word is shifted, one or more bits are translated from a given pixel characteristic into an adjacent pixel characteristic. This corrupts the value of the adjacent pixel characteristic. The prior art methods store each pixel characteristic (i.e., byte) within an individual data word (unpacking) to eliminate this problem. The prior art method for performing the blending interpolation is shown in the flowchart of FIG. 2. In the first step, the blending factor and packed data words corresponding to the foreground pixel and the background pixel are retrieved. Next, each first pixel characteristic within the packed foreground pixel data word is placed into an individual data word (unpacked), after which each corresponding pixel characteristic within the packed background pixel data word is placed into an individual data word. The unpacking process is carried out through logical and shifting operations. Next, the mathematical operations required for interpolation are carried out on each corresponding pair of data words. These operations comprise adding appropriately shifted versions of the original packed data words, the effect of which is to multiply one data word by a fractional constant $k=m2^{-n}$ specified by the blending factor, followed by multiplying the other data word by (1-k), and forming the sum of the two data words. Each result is then stored in a packed result data word via a packing process. This step, as with the earlier unpacking process, is implemented with logical and shifting operations. Once interpolation has taken place between all appropriate pixel characteristic pairs and the results have been packed into the packed result data word, the method ends, with the composite pixel characteristics contained within the packed result word. For the pixel representation shown in FIG. 1, the prior art method requires eight unpacking steps and four packing steps. As detailed in Appendix A, a pseudo-code assembly language program is shown which performs an exemplary interpolation between foreground and background pixel characteristics using the prior art method. The blending is particularly simple in this case, wherein the composite pixel characteristics are comprised of fifty percent of the foreground pixel's characteristics and fifty percent of the background pixel's characteristics. In other words, this is a scaling of the foreground and background pixel characteristics by $2^{-1}$. As can be seen from the pseudo-code, 47 assembly language steps are required.

Each unpacking and packing step in the prior art method requires a given amount of time to complete. Moreover, replication of the same mathematical operations required for interpolation adds to the time required to complete the interpolation process. Current technology has made an image size of 1024×768, or 786,432 pixels commonplace. In the pixel representation depicted in FIG. 1, such an image comprises millions of pixel characteristics. As a result, millions of interpolations and an even greater number of computational operations must be performed when forming a composite image. Any reduction in the time required for a pixel-by-pixel operation will therefore significantly decrease the overall time required to modify the image displayed. What is needed is a method for performing an interpolation in which operations occur simultaneously on all pixel characteristics within two packed data words. This would eliminate the need to unpack and repack data words and ensure that operations required for the interpolation are performed only one time, thereby minimizing the interpolation time.

SUMMARY OF THE INVENTION

The present invention is a method for performing a parallel interpolation between the pixel characteristics within two packed data words. A blending factor is used to indicate the extent to which the pixel characteristics in a packed foreground data word are scaled relative to those in a packed background data word, where the scaling is related to a power of two. Unpacking and packing steps are unnecessary, as all pixel characteristics within a packed data word are scaled simultaneously. The method of the present invention preferably comprises the steps of: creating shifted versions of the packed foreground pixel data word and the packed background pixel data word; inserting a guard bit into the most-significant bit (MSB) position of each pixel characteristic within the two shifted packed data words; adding the two shifted packed data words to create a packed result data word; determining the value of the blending factor; and adding a packed adjustment data word formed from either the packed foreground or background data word to the packed result data word based upon the value of the blending factor. A plurality of guard bits are inserted into each packed adjustment data word prior to their addition to the packed result data word. Upon completion of the method, the packed result data word is interpreted as a packed composite pixel data word.

The process of shifting a packed data word followed by guard bit insertion is equivalent to scaling each pixel characteristic within the packed data word by $2^{-1}$. The packed result data word is therefore a 50% blending of the sum of pixel characteristics from each packed data word.

DETAILED DESCRIPTION OF THE PREFERRED EMBODIMENT

The method of the present invention performs a parallel combination of a foreground pixel's characteristics with a background pixel's corresponding characteristics. Each pixel is considered to be represented by a packed data word in a representation similar to FIG. 1. Thus, the foreground pixel characteristics are specified by a packed foreground pixel data word, and the background pixel characteristics are specified by a packed background pixel data word. The combination of pixel characteristics is achieved through an interpolation, the details of which are specified by a blending factor. All pixel characteristics within a packed data word are scaled simultaneously, thereby eliminating the need for the unpacking and packing steps of the prior art. The result of the interpolation is a packed composite pixel data word which comprises the characteristics of a composite pixel. The blending factor corresponds to a fractional constant $k=m2^{-n}$. In the formation of the composite pixel characteristics, the foreground pixel characteristics are multiplied by k and the background pixel characteristics are multiplied by (1-k). The composite pixel characteristics are obtained from the sum of the foreground and background pixel characteristics after their multiplication by k and (1-k), respectively. A blending factor corresponding to a 100% blending indicates that the foreground pixel characteristics are weighted 100% and the background pixel characteristics are weighted 0%; in this case, k=1. In like manner, a blending factor corresponding to a 25% blending corresponds k=0.25, and indicates that the foreground pixel characteristics are weighted 25% and the background pixel characteristics are weighted 75%.

The method of the present invention is implemented on a computer system comprising a CPU, an input, a graphics output, a given amount of RAM and ROM memory, and a data storage means. An exemplary computer system is that of an Apple personal computer having a Motorola MC68040 microprocessor CPU, a 1024×768 CRT graphics display, 8 Mb of RAM, and a 120 Mb or larger hard disk drive. The method of the present invention is stored in RAM, and is executed by the CPU. Values corresponding to the foreground and background images are preferably stored in RAM.

The prior art method for performing an interpolation between corresponding pixel characteristics within two packed data words relies upon placing each pixel characteristic into separate a data word. In a pixel representation having four pixel characteristics within each packed data word, the prior art separates the four pixel characteristics into four words, performs the interpolation on the four words separately, and then recombines the four words into a packed data word. In the method of the present invention, the packing steps are eliminated and the interpolation of all the pixel characteristics occurs simultaneously, thereby significantly shortening the time required to interpolate the foreground and background pixel characteristics. In the method of the present invention, the constant k indicated by a given blending factor is defined to be equal to $m2^{-n}$, where m and n are the smallest non-negative integers that will provide a desired fractional scaling, and $m2^{-n}$ is less than or equal to 1. Thus, blending result in multiplication of the foreground pixel characteristics by $m2^{-n}$ and multiplication of the background pixel characteristics by $(1-m2^{-n})$. A multiplication by $2^{-n}$ simply corresponds to shifting a binary number n bit positions to the right.

Figure 3A:
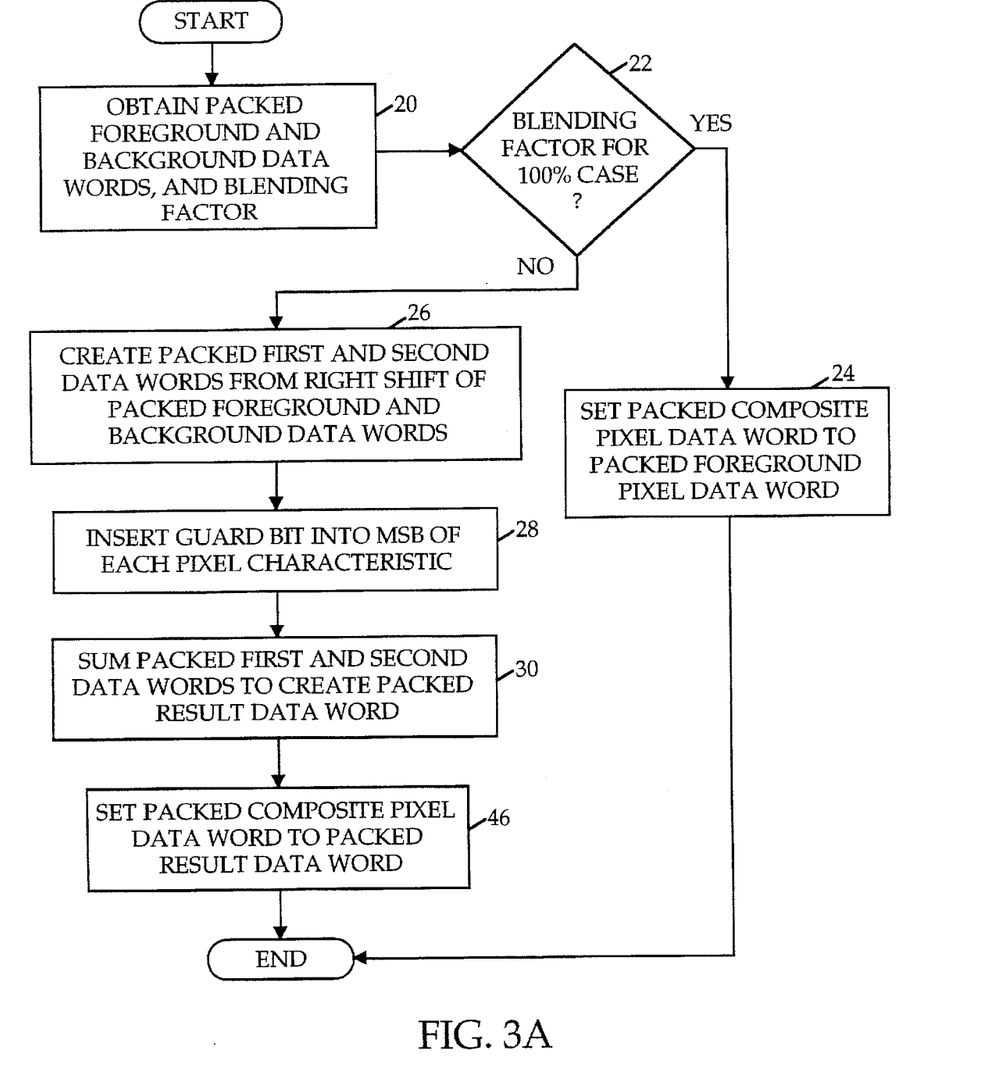
FIG. 3a is a flowchart of the preferred method of the present invention for parallel interpolation between a plurality of pixel characteristics within two data words for a one-bit blending factor.

A flowchart of the preferred method of the present invention for a one-bit blending factor is shown in FIG. 3a. A one-bit blending factor allows for two possible blendings, namely 100% and 50%. The method begins in step 20 by obtaining the packed foreground pixel data word, the packed background pixel data word, and the blending factor. In the preferred embodiment of the present invention, these are stored in RAM. In step 22, the method continues with a determination of whether the blending factor corresponds to a 100% blending. A 100% blending indicates that the composite pixel characteristics are identical to those of the foreground pixel. In the event of a 100% blending, the packed composite pixel data word is equated to the packed foreground pixel data word in step 24, after which the method ends. If it was determined in step 22 that the blending factor does not indicate a 100% blending, the method creates a packed first data word and a packed second data word in step 26 through a single-bit right-shift of the packed foreground and background data words, respectively. Next, in step 28, a zero-value guard bit is inserted into the MSB of each pixel characteristic within the packed first and second data words. This is accomplished through a logical AND operation between the packed first and second data words and a first packed guard word. The first packed guard word comprises a plurality of first packed guard word pixel characteristics, each of which comprises a first guard constant. The first guard constant has a value of $(2^{(i-1)}-1)$, where i is the number of bits used to represent each pixel characteristic within the packed foreground and background data words. Thus, in the pixel representation of FIG. 1, the first guard constant has a value of $(2^{(8-1)}-1)=127$, or 7F in Hexadecimal format. The first packed guard word therefore comprises the Hexadecimal value 7F7F7F7F. Since each pixel characteristic is defined by the bit positions it occupies within a packed data word, insertion of the guard bit ensures that the least-significant bit (LSB) of any pixel characteristic does not influence the value of the adjacent pixel characteristic as a result of the shift performed in step 26. The net effect of the shift performed in step 26 and the guard bit insertion performed in step 28 is to simultaneously scale each pixel characteristic within the packed first and second data words by $2^{-1}$. In step 30, the method next creates a packed result data word from the sum of the packed first and second data words. Since each pixel characteristic in the packed first and second data words have been scaled by $2^{-1}$ as a result of steps 26 and 28, the packed result data word formed in step 30 corresponds to a 50% blending. The packed result data word is then set as the packed composite data word in step 46, after which the method ends.

Figure 3B:
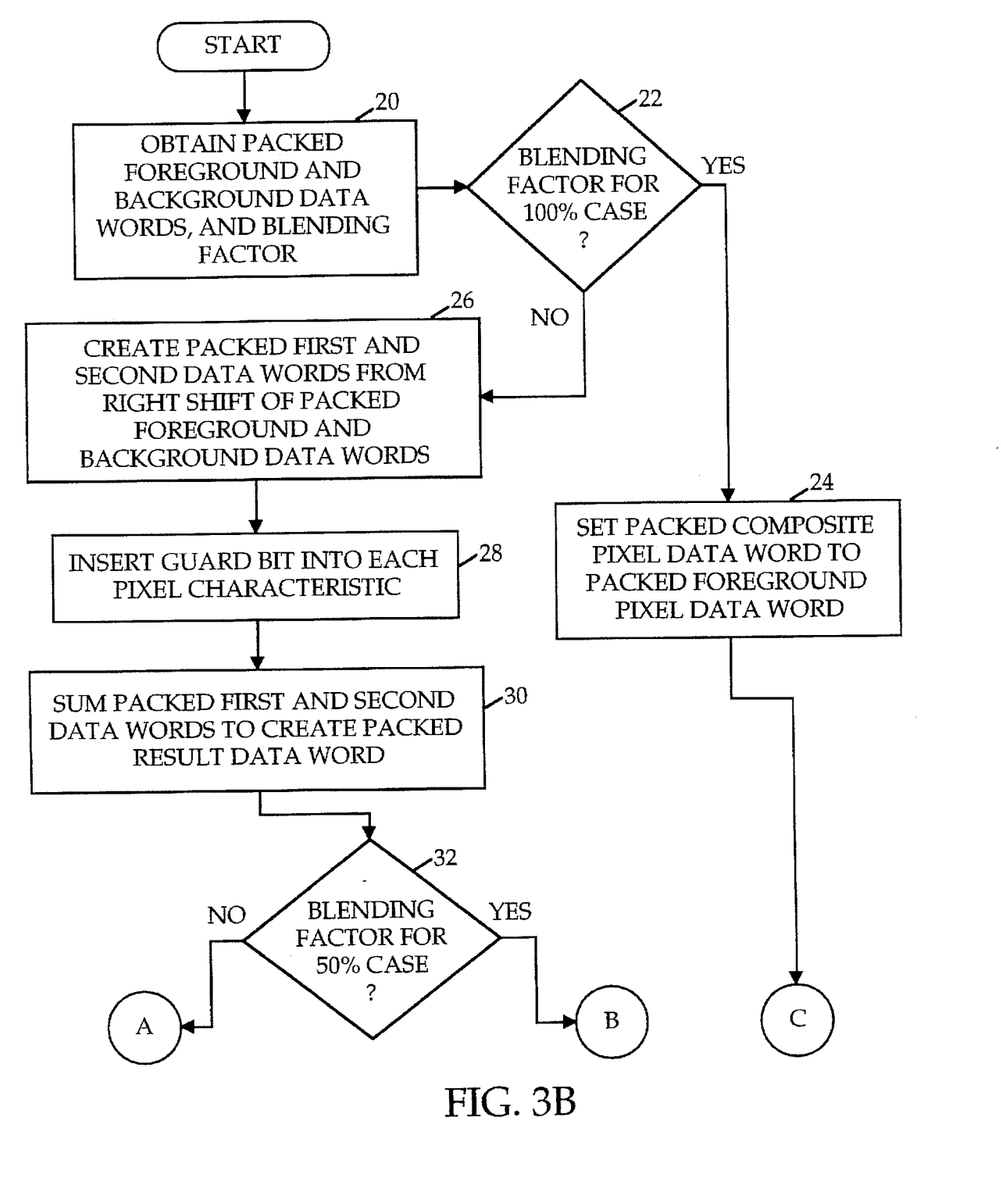
FIG. 3b and 3c is a flowchart of the preferred method of the present invention for parallel interpolation between a plurality of pixel characteristics within two data words for a two-bit blending factor.

Referring now to FIG. 3b, a flowchart of the preferred method of the present invention for a two-bit blending factor is shown. A two-bit blending factor allows for four possible blendings, using the binary values 00, 01, 10, and 11. In the preferred method, the value 00 corresponds to the composite pixel being formed from 100% of the foreground pixel. The value 01 corresponds to the composite pixel being formed from 75% of the foreground pixel and 25% of the background pixel. In like manner, the value 10 corresponds to the composite pixel being formed from 50% of the foreground pixel and 50% of the background pixel, while the value 11 corresponds to the composite pixel being formed from 25% of the foreground pixel and 75% of the background pixel. Other possible encodings would be readily apparent to those skilled in the art. Common step numberings are used for steps identically performed in both FIG. 3a and FIG. 3b. The method begins in step 20 by obtaining the packed foreground pixel data word, the packed background pixel data word, and the blending factor. In step 22, the method continues with a determination of whether the blending factor corresponds to a 100% blending. A 100% blending indicates that the composite pixel characteristics are identical to those of the foreground pixel. In the event of a 100% blending, the packed composite pixel data word is equated to the packed foreground pixel data word in step 24, after which the method ends. If it was determined in step 22 that the blending factor does not indicate a 100% blending, the method creates a packed first data word and a packed second data word in step 26 through a single-bit right-shift of the packed foreground and background data words, respectively. Next, in step 28, a zero-value guard bit is inserted into the MSB of each pixel characteristic within the packed first and second data words. This is accomplished through a logical AND operation between the packed first and second data words and a first packed guard word. The first packed guard word comprises a plurality of first packed guard word pixel characteristics, each of which comprises a first guard constant. The first guard constant has a value of $(2^{(i-1)}-1)$, where i is the number of bits used to represent each pixel characteristic within the packed foreground and background data words. Thus, in the pixel representation of FIG. 1, the first guard constant has a value of $(2^{(8-1)}-1)=127$, or 7F in Hexadecimal format. The first packed guard word therefore comprises the Hexadecimal value 7F7F7F7F. Insertion of the guard bit ensures that the LSB of any pixel characteristic does not influence the value of the adjacent pixel characteristic as a result of the shift performed in step 26. The net effect of the shift performed in step 26 and the guard bit insertion performed in step 28 is to simultaneously scale each pixel characteristic within the packed first and second data words by $2^{-1}$. In step 30, the method next creates a packed result data word from the sum of the packed first and second data words. Since each pixel characteristic in the packed first and second data words have been scaled by $2^{-1}$ as a result of steps 26 and 28, the packed result data word formed in step 30 corresponds to a 50% blending. In step 32, the method determines if the blending factor indicates that a 50% blending is desired. If so, the packed result data word is set as the packed composite data word in step 46 and the method ends. If a blending other than 50% was indicated in step 32, the method next determines if a 75% blending or a 25% blending is required in step 34. Thus, step 34 preferably comprises a comparison test. Next, in step 36, the method shifts the packed result data word right by one bit position. In step 38, a zero-value guard bit is inserted into each pixel characteristic within the result data word; this is accomplished through a logical AND operation between the packed result data word and a second packed guard word. The second packed guard word comprises a plurality of second packed guard word pixel characteristics, each of which comprises a second guard constant. The second guard constant has a value of $(2^{(i-1)}-1)$, where i is the number of bits used to represent each pixel characteristic within the packed foreground and background pixel data words. Thus, in the pixel representation of FIG. 1, the second guard constant has a value of $(2^{(8-1)}-1)=127$, or 7F in Hexadecimal format. The second packed guard word therefore comprises the values 7F7F7F7F. In a manner similar to step 28, insertion of the guard bit ensures that the LSB of any pixel characteristic does not influence the value of the adjacent pixel characteristic as a result of the shift performed in step 38.

The blending factor indicates a scaling of the foreground pixel characteristics by $m2^{-n}$ and of the background pixel characteristics by $(1-m2^{-n})$, or equivalently, $(2^n-m)2^{-n}$. For the two-bit blending factor, n=2. Upon completion of step 38, each of the pixel characteristics within the packed result data word therefore comprises the sum of the corresponding pixel characteristics within the packed foreground and background data words scaled by $2^{-2}$, or 25%. If a 75% blending is desired, a version of the packed foreground pixel data word in which the pixel characteristics have been multiplied by 50% must be added to the packed result data word at this point. For a 25% blending, a 50%-scaled background pixel data word must be added to the packed result data word. In step 40, a packed adjustment data word is created to accomplish the adjustment. In the case of a 75% blending, the packed adjustment data word comprises the packed foreground pixel data word right-shifted one bit position. For a 25% blending, the packed adjustment data word comprises the packed background pixel data word right-shifted one bit position. In step 42, a zero-value guard bit is inserted into each pixel characteristic within the packed adjustment data word, where the guard bit insertion is accomplished through a logical AND operation between a given packed adjustment data word and a corresponding packed adjustment guard word. The packed adjustment guard word comprises a plurality of packed adjustment guard word pixel characteristics, each of which comprises an adjustment guard constant. The adjustment guard constant has a value of $(2^{(i-1)}-1)$, where i is the number of bits used to represent each pixel characteristic within the packed foreground and background pixel data words. Thus, in the pixel representation of FIG. 1, the adjustment guard constant has a value of $(2^{(8-1)}-1)=127$, or 7F in Hexadecimal format. The corresponding packed adjustment guard word therefore comprises the values 7F7F7F7F. Next, in step 44, the packed adjustment data word is added to the packed result data word. The net effect of steps 40, 42, and 44 is to complete the required blending. In step 46, the packed result data word is returned as the composite pixel data word.

As an example of a blending with the method of the present invention, a 75% blending is considered. It is assumed that four single-byte pixel characteristics occupy a 32-bit packed data word as in FIG. 1. Referring also now to FIGS. 4(a)–(f), it is further assumed that the packed foreground data word and the packed background data word comprise pixel characteristics having the binary values indicated in FIG. 4(a). As the blending is 75%, the foreground pixel characteristics are to be multiplied by $3*2^{-2}$, and the background pixel characteristics by $(1-(3*2^{-2}))$, or $2^{-2}$. In other words, m equals 3 and n equals 2 in this case. Following the steps of FIG. 3, the method obtains the packed foreground and background data words and the blending factor in step 20. In step 22, the method finds that a 100% blending is not desired. The packed first and second packed data words are created in step 26 by a single-bit right shift of the packed foreground and background data words, respectively. In step 28, the zero-value guard bit is inserted into the MSB of each pixel characteristic within the packed first and second data words. The packed first and second data words are shown after this step in FIG. 4(b). The packed result data word is created from the sum of the packed first and second data words in step 30, and is shown in FIG. 4(c). Since this example is not a 50% blending, step 32 is followed by step 34 with a determination that a 75% blending is desired. Step 36 then performs a right-shift of the packed result data word by one bit-position, after which a zero-value guard bit is inserted into the MSB of every pixel characteristic within the packed result data word in step 38. The contents of the packed result data word at this point are shown in FIG. 4(d). The contents of the packed result data word now correspond to one-fourth of the value of the foreground pixel characteristics plus one-fourth of the value of the associated background characteristics. Thus, the contents of the packed result data word must be adjusted with a packed adjustment data word having contents corresponding to one-half of the value of the foreground pixel characteristics in order to complete the blending. A packed adjustment data word is therefore formed from a one-bit right shift of the packed foreground pixel data word in step 40. A zero-value guard bit is inserted into the MSB of each pixel characteristic within the packed adjustment data word in step 42. The contents of the packed adjustment data word are shown in FIG. 4(e). Next, the packed adjustment data word is added to the packed result data word in step 44, and the packed result data word is set as the packed composite pixel data word in step 46, after which the method ends. The contents of the packed composite pixel data word are shown in FIG. 4(f).

Figure 4A:
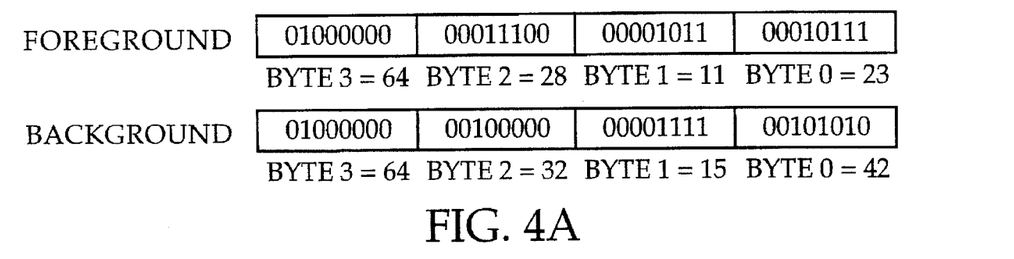
FIG. 4(a) shows a packed foreground pixel and a packed background pixel data word prior to their combination in an exemplary blending according to the method of the present invention.
Figure 4B:
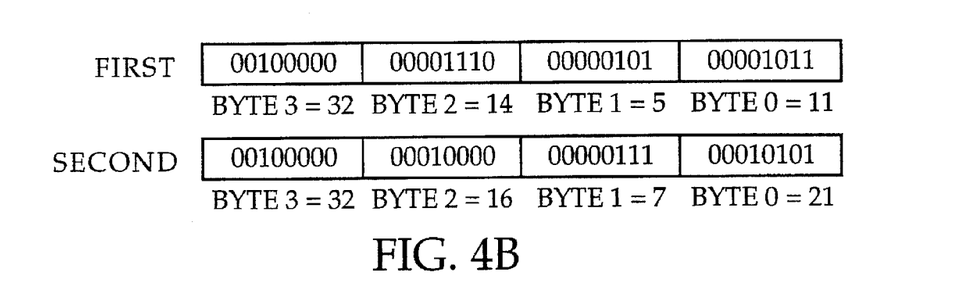
FIG. 4(b) shows a packed first data word and a packed second data word formed during the exemplary blending.

In FIG. 4(a), bytes 0 through 3 within the packed foreground pixel data word have the values 23, 11, 28, and 64, respectively. Within the packed background pixel data word, the corresponding bytes have the values 42, 15, 32, and 64. Thus, a 75% blending ideally generates the attendant values 27.75, 12, 29, and 64. However, the attendant composite pixel characteristics in FIG. 4(f) have the values 27, 11, 29, and 64. It is readily seen that an interpolation between two pixel characteristics represented by even binary values produces the correct composite pixel characteristic value. The presence of an odd-valued pixel characteristic, however, introduces a small error. This is due to the shifting performed in the method. A right-shift performed on an odd value results in the loss of the 1 in the value's LSB. Pixel characteristics are commonly represented by byte values, which allows a given pixel characteristic to have a value ranging from 0 to 255. The values within this range attempt to emulate a visual phenomenon in a continuous manner. As a result, it is difficult to distinguish visual differences between pixel characteristics having values differing only in the least-significant bit. Image processing texts such as that by Pratt indicate that the human eye can distinguish bit-level variations within a pixel characteristic's dynamic range only when the dynamic range is represented by six or fewer bits. For example, if a pixel characteristic having a value of 128 corresponds to a given shade of red within an eight-bit dynamic range, the shade of red specified by a value of 129 would appear to be identical to that specified by the value 128. As a result, the small amount of error that can be introduced by the method of the present invention is generally not significant.

Figure 3C:
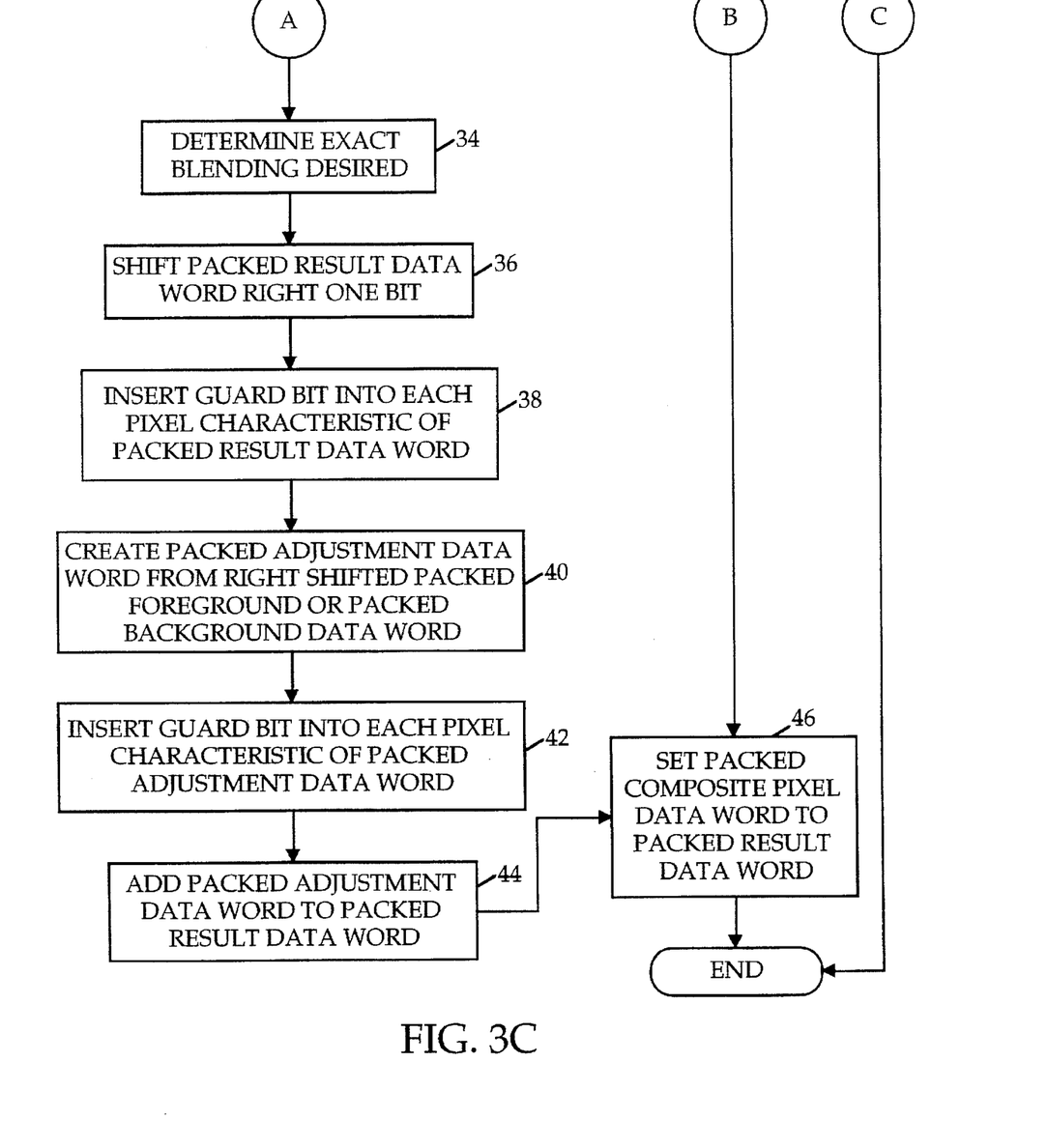
Figure 4C:
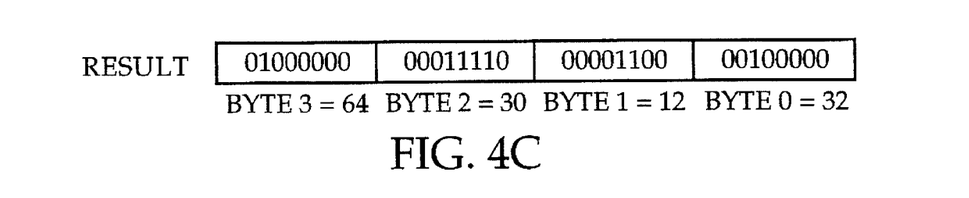
FIG. 4(c) shows a packed result data word immediately after its creation in the exemplary blending.
Figure 4D:
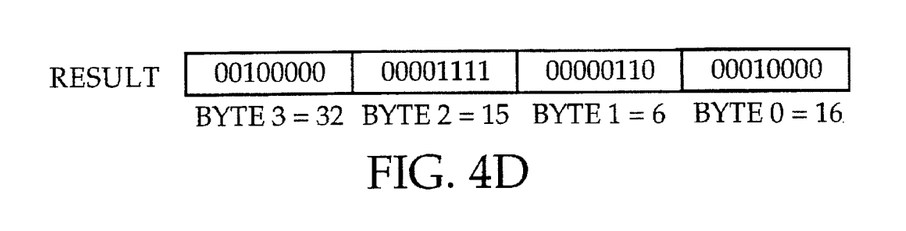
FIG. 4(d) shows a packed result data word after shifting and guard bit insertion in the exemplary blending.
Figure 4E:
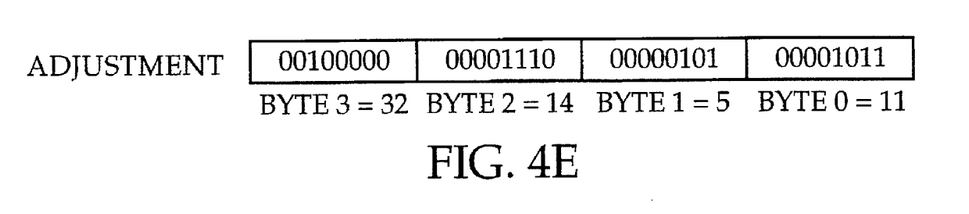
FIG. 4(e) shows a packed adjustment data word in the exemplary blending.
Figure 4F:
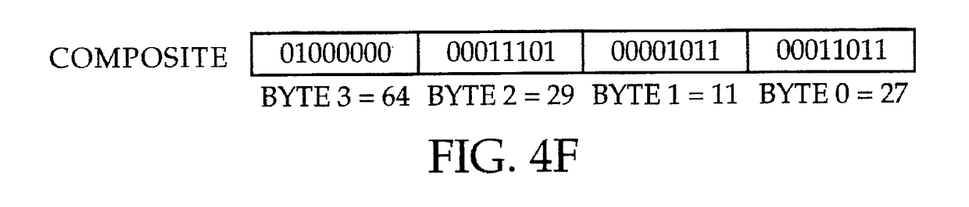
FIG. 4(f) shows a packed composite pixel data word obtained upon completion of the exemplary blending.

As shown in Appendix B, a sequence of eight pseudo-code assembly language instructions is shown in which the method of the present invention is used to implement the portion of a 50% blending corresponding to steps 26 through 30 in FIG. 3. This sequence is functionally identical to the prior art sequence shown in FIG. 2. While forty-seven pseudo-code assembly language instructions were required in the prior art method, the method of the present invention requires only eight. This represents a significant reduction in the time required by the prior art to perform the 50% blending.

While the present invention has been described with reference to a certain preferred embodiment, those skilled in the art will recognize that various modifications may be provided. For example, modifications might include, but would not be limited to, generalization of the method of the present invention to a blending factor having three or more bits. A three bit blending factor, for example, would allow blendings of 100%, 87.5%, 75%, 62.5%, 50%, 37.5%, 25%, and 12.5%. In the generalization, the 100% blending case is first considered, followed by consideration of the 50% blending case. The 75% and 25% cases are next considered. The method would then provide additional loops for the cases of 87.5%, 62.5%, 37.5%, and 12.5% blendings, and process each case accordingly. Those skilled in the art can extrapolate the process of adding further processing dependent upon the number of bits in the blending factor. These and other variations upon and modifications to the preferred embodiment are provided for by the present invention which is limited only by the following claims.

APPENDIX A

| | |
|---|---|
| store | r2, -(sp) |
| store | r3, -(sp) |
| load | a, r0 |
| and | 0xFF, r0 |
| load | b, r1 |
| and | 0xFF, r1 |
| move | r0, r2 |
| ushr | 1, r2 |
| move | r2, r3 |
| load | a, r0 |
| ushr | 8, r0 |
| and | 0xFF, r0 |
| load | b, r1 |
| ushr | 8, r1 |
| and | 0xFF, r1 |
| move | r0, r2 |
| add | r1, r2 |
| ushr | 1, r2 |
| ushl | 8, r2 |
| or | r2, r3 |
| load | a, r0 |
| ushr | 16, r0 |
| and | 0xFF, r0 |
| load | b, r1 |
| ushr | 16, r1 |
| and | 0xFF, r1 |
| move | r0, r2 |
| add | r1, r2 |
| ushr | 1, r2 |
| ushl | 16, r2 |
| or | r2, r3 |
| load | a, r0 |
| ushr | 24, r0 |
| and | 0xFF, r0 |
| load | b, r1 |
| ushr | 24, r1 |
| and | 0xFF, r1 |
| move | r0, r2 |
| add | r1, r2 |
| ushr | 1, r2 |
| ushl | 24, r2 |
| or | r2, r3 |
| move | r3, r0 |
| load | (sp)+, r3 |
| load | (sp)+, r2 |
| ret | |

APPENDIX B

| | |
|---|---|
| load | a, r0 |
| ushr | 1, r0 |
| and | 0x7F7F7F7F, r0 |
| load | b, r1 |
| ushr | 1, r1 |
| and | 0x7F7F7F7F, r1 |
| add | r1, r0 |
| ret | |

What is claimed is:

1. A method for combining images using parallel interpolation between a packed foreground pixel data word having a plurality of foreground pixel characteristics and a packed background pixel data word having a plurality of background pixel characteristics, the interpolation specified by a blending factor and resulting in the creation of a packed composite pixel data word having a plurality of composite pixel characteristics, the method comprising the steps of:

retrieving the packed foreground pixel data word, the packed background pixel data word, and the blending factor;

creating a packed first data word from the packed foreground pixel data word and a packed second data word from the packed background pixel data word;

inserting a guard bit into the most-significant bit (MSB) position of each pixel characteristic within the packed first data word and the packed second data word; and adding the packed first data word and the packed second data word to create a packed composite pixel data word.

2. The method for combining images using parallel interpolation according to claim 1, wherein the packed first data word is created from a one-bit right shift of the packed foreground pixel data word.

3. The method for combining images using parallel interpolation according to claim 1, wherein the packed second data word is created from a one-bit right shift of the packed background pixel data word.

4. The method for combining images using parallel interpolation according to claim 1, wherein the guard bit insertion into the packed first and second data words is accomplished through a logical AND operation between the respective data words and a first packed guard word.

5. The method for combining images using parallel interpolation according to claim 4, wherein the first packed guard word comprises a plurality of first packed guard word pixel characteristics, each of which comprises a first guard constant having a value of $(2^{(i-1)}-1)$, where i is the number of bits used to represent each pixel characteristic.

6. The method for combining images using parallel interpolation according to claim 1, wherein the method tests for a 100% blending after the step of retrieving the packed foreground pixel data word, the packed background pixel data word, and the blending factor, and sets the packed composite pixel data word to the packed foreground pixel data word in the event that a 100% blending is desired.

7. The method for combining images using parallel interpolation according to claim 1, wherein the method further comprises the step of testing for a 50% blending after creation of the packed composite pixel data word, followed by a plurality of further processing steps in the event that a 50% blending is not desired.

8. The method for combining images using parallel interpolation according to claim 7, wherein the plurality of further processing steps comprise the steps of:

shifting the packed composite pixel data word;

inserting a guard bit into the most-significant bit (MSB) position of each pixel characteristic within the shifted packed composite pixel data word;

creating a packed adjustment data word;

inserting a guard bit into the most-significant bit (MSB) position of each pixel characteristic within the packed adjustment data word; and summing the packed composite pixel data word and the packed adjustment data word.

9. The method for combining images using parallel interpolation according to claim 8, wherein the step of shifting the packed composite pixel data word comprises a right shift.

10. The method for combining images using parallel interpolation according to claim 8, wherein the step of inserting the guard bit into the most-significant bit (MSB) position of each pixel characteristic within the shifted packed composite pixel data word is accomplished through a logical AND operation between the shifted packed composite pixel data word and a second packed guard word.

11. The method for combining images using parallel interpolation according to claim 10, wherein the second packed guard word comprises a plurality of second packed guard word pixel characteristics, each of which comprises a second guard constant having a value of $(2^{(i-1)}-1)$, where i is the number of bits used to represent each pixel characteristic.

12. The method for combining images using parallel interpolation according to claim 8, wherein the packed adjustment data word is created from one from the group of the packed foreground pixel data word and the packed background pixel data word.

13. The method for combining images using parallel interpolation according to claim 12, wherein the packed adjustment data word comprises a right-shifted version of one from the group of the packed foreground pixel data word and the packed background pixel data word.

14. The method for combining images using parallel interpolation according to claim 8, wherein the step of inserting the guard bit into the most-significant bit (MSB) position of each pixel characteristic within the packed adjustment data word is accomplished through a logical AND operation between the packed adjustment data word and a packed adjustment guard word.

15. The method for combining images using parallel interpolation according to claim 14, wherein the packed adjustment guard word comprises a plurality of packed adjustment guard word pixel characteristics, each of which comprises an adjustment guard constant having a value of $(2^{(i-1)}-1)$, where i is the number of bits used to represent each pixel characteristic.

16. A method for combining images using parallel interpolation between a packed foreground pixel data word comprising a plurality of foreground pixel characteristics and a packed background pixel data word comprising a plurality of background pixel characteristics, the exact interpolation specified by a blending factor and resulting in the creation of a packed composite pixel data word, the method comprising the steps of:

creating a packed result data word from shifted versions of the packed foreground and background pixel data words;

inserting a guard bit into the most-significant bit (MSB) position of each pixel characteristic within the packed result data word;

creating a packed adjustment data word;

inserting a guard bit into the most-significant bit (MSB) position of each pixel characteristic within the packed adjustment data word; and summing the packed result data word and the packed adjustment data word.

17. A method for combining images using parallel interpolation between a packed foreground pixel data word comprising a plurality of foreground pixel characteristics and a packed background pixel data word comprising a plurality of background pixel characteristics, the exact interpolation specified by a blending factor and resulting in the creation of a packed composite pixel data word, the method comprising:

determination of whether the blending factor corresponds to a 100% blending;

equating the contents of the packed composite pixel data word to the contents of the packed foreground pixel data word if the blending factor corresponds to a 100% blending;

if the blending factor does not correspond to a 100% blending, performing the substeps of:

creating a packed first data word from the packed foreground pixel data word;

creating a packed second data word from the packed background pixel data word;

insertion of a guard-bit into each pixel characteristic within the packed first data word;

insertion of a guard-bit into each pixel characteristic within the packed second data word;

creating a packed result data word from the sum of the packed first data word and the packed second data word;

determining whether the blending factor indicates a 50% blending;

returning the packed result data word as the packed composite pixel data word in the event that the blending factor indicates a 50% blending;

if the blending factor does not indicate a 50% blending, performing the substeps of:

determining the exact blending desired in the event that the blending factor does not indicate a 50% blending;

right-shifting the packed result data word;

inserting a guard bit into each pixel characteristic within the packed result data word;

creating a packed adjustment data word;

inserting a guard bit into each pixel characteristic within the packed adjustment data word;

adding the contents of the packed adjustment data word to the contents of the packed result data word; and returning the packed result data word as the packed composite pixel data word.

18. An apparatus for combining images through parallel interpolation between a packed foreground pixel data word having a plurality of foreground pixel characteristics and a packed background pixel data word having a plurality of background pixel characteristics, the interpolation specified by a blending factor and resulting in the creation of a packed composite pixel data word having a plurality of composite pixel characteristics, the apparatus comprising:

a means for retrieving the packed foreground pixel data word, the packed background pixel data word, and the blending factor, the retrieving means having an input and an output;

a first means for creating a packed first data word from the packed foreground pixel data word and a packed second data word from the packed background pixel data word, the first creating means having an input and an output, the input of the first creating means coupled to the output of the retrieving means;

a first means for inserting a guard bit into each pixel characteristic of the packed first and second data words, the first guard bit inserting means having an input and an output, the input of the first guard bit inserting means coupled to the output of the first creating means; and a first means for summing the packed first and second data words to create a packed composite pixel data word, the first summing means having an input and an output, the input of the first summing means coupled to the output of the first guard bit inserting means.

19. The apparatus of claim 18, wherein the first creating means is a shift register.

20. The apparatus of claim 18, wherein the first guard bit inserting means comprises a means for performing a logical AND operation having a first input, a second input and an output, the first input of the performing means coupled to receive a packed data word and the second input of the performing means coupled to receive a packed guard word.

21. The apparatus of claim 18, wherein the first summing means comprises an adder.

22. The apparatus of claim 18, further comprising a means for testing the value of the blending factor and outputting a signal if the blending factor has a predetermined value, the testing means having an input and an output, the input of the testing means coupled to the output of the retrieving means.

23. The apparatus of claim 18, further comprising a second means for creating a packed third data word by shifting the packed composite pixel data word, the second creating means having an input and an output, the input of the second creating means coupled to the output of the first summing means.

24. The apparatus of claim 23, further comprising a second means for inserting a guard bit into each pixel characteristic of the packed third data word, the second guard bit inserting means having an input and an output, the input of the second guard bit inserting means coupled to the output of the second creating means.

25. The apparatus of claim 24, further comprising a third means for creating a packed adjustment data word, the third creating means having an input and an output, the input of the third creating means coupled to the output of the retrieving means.

26. The apparatus of claim 25, further comprising a third means for inserting a guard bit into each pixel characteristic of the packed adjustment data word, the third guard bit inserting means having an input and an output, the input of the third guard bit inserting means coupled to the output of the third creating means.

27. The apparatus of claim 26, further comprising a second means for summing having an first input, a second input and an output, the second summing means adding the packed adjustment data word and the packed third data word, the first input of the second summing means coupled to the output of the third guard bit inserting means, and the second input of the second summing means coupled to the output of the second guard bit inserting means.

* * * * *